United States Patent [19]
Tai

[11] Patent Number: 5,258,870
[45] Date of Patent: Nov. 2, 1993

[54] PROJECTION SCREEN
[75] Inventor: Yaeko Tai, Kobe, Japan
[73] Assignee: Shikishima Boseki Kabushiki Kaisha, Osaka, Japan
[21] Appl. No.: 927,982
[22] Filed: Aug. 11, 1992
[30] Foreign Application Priority Data Aug. 12, 1991 [JP] Japan ................. 3-201625

[51] Int. Cl.$^5$ ............................. G03B 21/56
[52] U.S. Cl. .................................... 359/445
[58] Field of Search ............. 359/444, 445; 352/34, 352/104, 1

[56] References Cited
U.S. PATENT DOCUMENTS 3,692,384  9/1972  Kimura et al. ............... 359/445
4,006,965  2/1977  Takada et al. ............... 359/445 X
5,140,460  8/1992  Fukuhara et al. ............. 359/445

Primary Examiner—Richard A. Wintercorn
Attorney, Agent, or Firm—Nikaido, Marmelstein, Murray & Oram

[57] ABSTRACT

A projection screen enabling sharp pictorial images to be projected thereon and sound to penetrate therethrough from behind the screen, the entire screen being of uniformly knitted or woven structure, having a screen gain of not less than 0.80 and a permeability of not less than 100 cc/cm$^2$/sec and has the acoustic characteristic that the average of increase or decrease in the sound level in the audible frequency band is within ±1.0 dB and the maximum attenuation value is within −4.0 dB.

3 Claims, 5 Drawing Sheets

PROJECTION SCREEN

BACKGROUND OF THE INVENTION

1. Field of the Invention

The present invention relates to improvements in a reflection type screen for presenting projected pictorial images from a projector and more particularly the invention provides a projection screen penetrable by sound from behind the screen so that the sound can be heard directly from the screen with theater presence, the pictorial images being sharp, said screen being suitable, though not exclusively, as home theater use.

2. Description of Prior Art

Recently, TV sets having large-sized screens as large as 50 inches and above have appeared, and the screen is further increased in size and as a means for increasing truthfulness to life, there has been provided a projection type TV set wherein pictorial images from a projector are enlarged and projected on the screen. This projection type TV set has speakers disposed on the screen side.

Conventional projection-purpose screens include such screen as beads, pearl, white and silver according to the kind of the surface element to be used. These screens have their own merits and demerits and there is nothing to choose among them, but as far as sound is concerned, non-penetrable type is predominant. As for sound-penetrable type screens, there is one on the market which is similar to a theater screen which is uniformly perforated, but this one is considerably inferior in acoustic characteristic, making it impossible for people to enjoy sound with theater presence.

In the case of a conventional sound-nonpenetrable type screen, it is necessary to arrange speakers on opposite lateral sides or in the lower region; therefore, when the screen is increased in size, projected pictorial images and sound are separated too far from each other to attain visual or acoustic balance. There is a theater-use screen uniformly perforated to allow sound to penetrate therethrough, but if this is used in a narrow space (such as a theater or class room), the viewing distance is too short, bringing the perforations into relief. And sharp pictorial images cannot be obtained or the acoustic characteristic is poor; thus, a satisfactory acoustic field cannot be obtained.

The present invention has been accomplished with attention paid to the above drawbacks in the conventional home theater-use projection screen and has for its object the provision of a projection screen which is designed for space saving for home theater use and which is penetrable by sound from behind the screen so that the sound can be heard directly from the screen with theater presence, the pictorial images being sharp.

SUMMARY OF THE INVENTION

To achieve said object, the present invention provides a projection screen having a screen gain of not less than 0.80 and a permeability of not less than 100 cc/cm$^2$/sec and has the acoustic characteristic that the average of increase or decrease in the sound level in the audible frequency band is within ±1.0 dB and the maximum attenuation value is within −4.0 dB, the entire screen being of uniformly knitted or woven structure.

The present invention makes it possible to provide a wide viewing angle without lowering screen gain by suitably designing the knitted or woven structure. In addition, the screen gain is a value which indicates the reflective characteristic which the screen structure inherently possesses; the light reflected by a standard white board is measured by a brightness meter and the measured value is taken as gain 1 and if the reflected light from a sample screen is double, the measured value is taken as gain 2. The permeability is measured by the JIS L1096B method. The term "acoustic characteristic" mentioned herein indicates how the generated sound pressure changes with frequency; it indicates how the sound pressure with a screen placed in front of the speaker attenuates as compared with the sound level with nothing placed.

Further, the screen of the present invention has a permeability of not less than 100 cc/cm$^2$/sec and has the acoustic characteristic that the average of increase or decrease in the sound level in the audible frequency band is within ±1.0 dB and the maximum attenuation value is within −4.0 dB, the entire screen being of uniformly knitted or woven structure. Therefore, the screen allows sound to penetrate therethrough from behind the screen without being substantially attenuated, and since the portion of the screen corresponding to sound-penetrable perforations is in the form of meshes formed by knitting or weaving, there is no disturbance of pictorial images.

According to the present invention, since pictorial images are projected on a screen having uniformly formed fine knitted or woven meshes, sharp pictorial images are obtained, and since sound is allowed to penetrate through said knitted or woven meshes from behind the screen, sound and pictorial images can be enjoyed with theater presence.

The space forming percentage of the screen is preferably 20–40%. If it exceeds 40%, the structure becomes rough, deteriorating the quality of pictorial images. If it is less than 20%, the acoustic characteristic lowers.

According to the present invention, the knitted or woven structure can be suitably designed without lowering the acoustic characteristic, so as to prevent disturbance of pictorial images.

Further, by coloring the back surface of the screen or bonding a metal thereto, contrast can be increased. In addition, the term "contrast" mentioned herein is a ratio defined by casting light to the screen, forming a shade by a shield and measuring the brightness of the resulting shaded portion (black portion) and lighted portion (white portion) and calculating the ratio of the two. The smaller the numerical value, the black portion appears tight, indicating that the contrast is good. In this case, the acoustic characteristic is prevented from lowering by taking measures not to block the meshes of the structure.

DESCRIPTION OF THE PREFERRED EMBODIMENTS

Figure 1B:
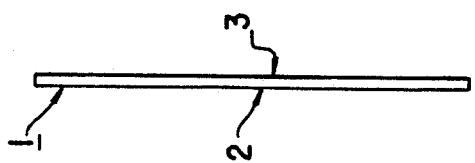
FIG. 1 is a schematic view of a screen according to the present invention, (A) being a front view of the screen, (B) being a side view.
Figure 1A:
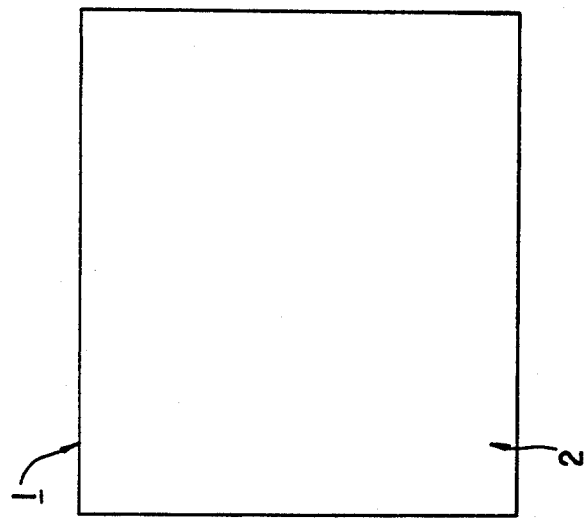

First, an embodiment shown in FIG. 1 will be described. The reference numeral 1 denotes a screen; 2 denotes the projection surface; and 3 denotes the back surface. The screen 1 is made by applying a Raschel knitted fabric knitted by a knitting machine having knitting needles arranged 28 per inch and using yarns of 150 d. The knitted fabric has a thickness of 0.53 mm, a space forming percentage of 32.3%, a permeability of 130-140 cc/cm$^2$/sec, and a screen gain of 0.8-1.0, and has the acoustic characteristic that the average of increase or decrease in the sound level in the audible frequency band is within ±1.0 dB and the maximum attenuation value is within −3.5 dB.

In the above factors, the kind of yarns used, yarn count, gage and structure have been given by way of example only, and they may be freely changed provided that the space forming percentage is 20-40%, the permeability and acoustic characteristic are in the above-mentioned ranges and the screen gain is not less than 0.80.

Further, the screen 1 may be made by weaving, and the kind and thickness of yarns to be used, density and structure may be freely selected within the range to meet the various characteristics mentioned above. Of course, knitted and woven structures may be combined.

The back surface 3 has a metal film formed by spattering. This process is performed to color the back surface by the color of the metal and improve the contrast based on reflection of light incident on the projection surface 1, in such a manner as not to block the knitted meshes. Instead of using spattering method, a metal film, such film may be formed by vapor deposition, ion plating or gas phase growth method or coloring may be made by heat transfer printing.

Figure 2:
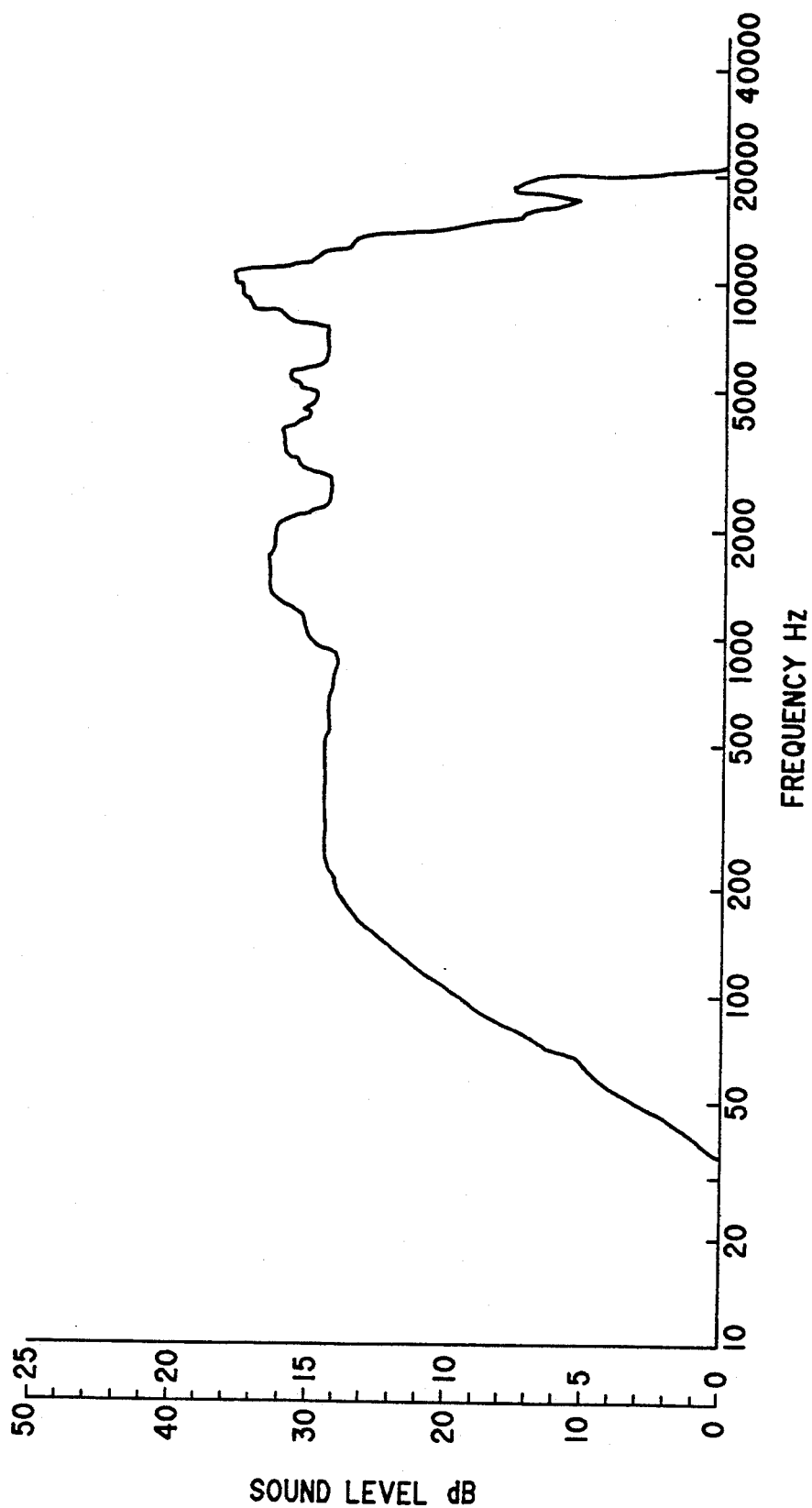
FIG. 2 is a graph showing the acoustic characteristic in the case where the screen of the present invention is placed in front of speakers.
Figure 3:
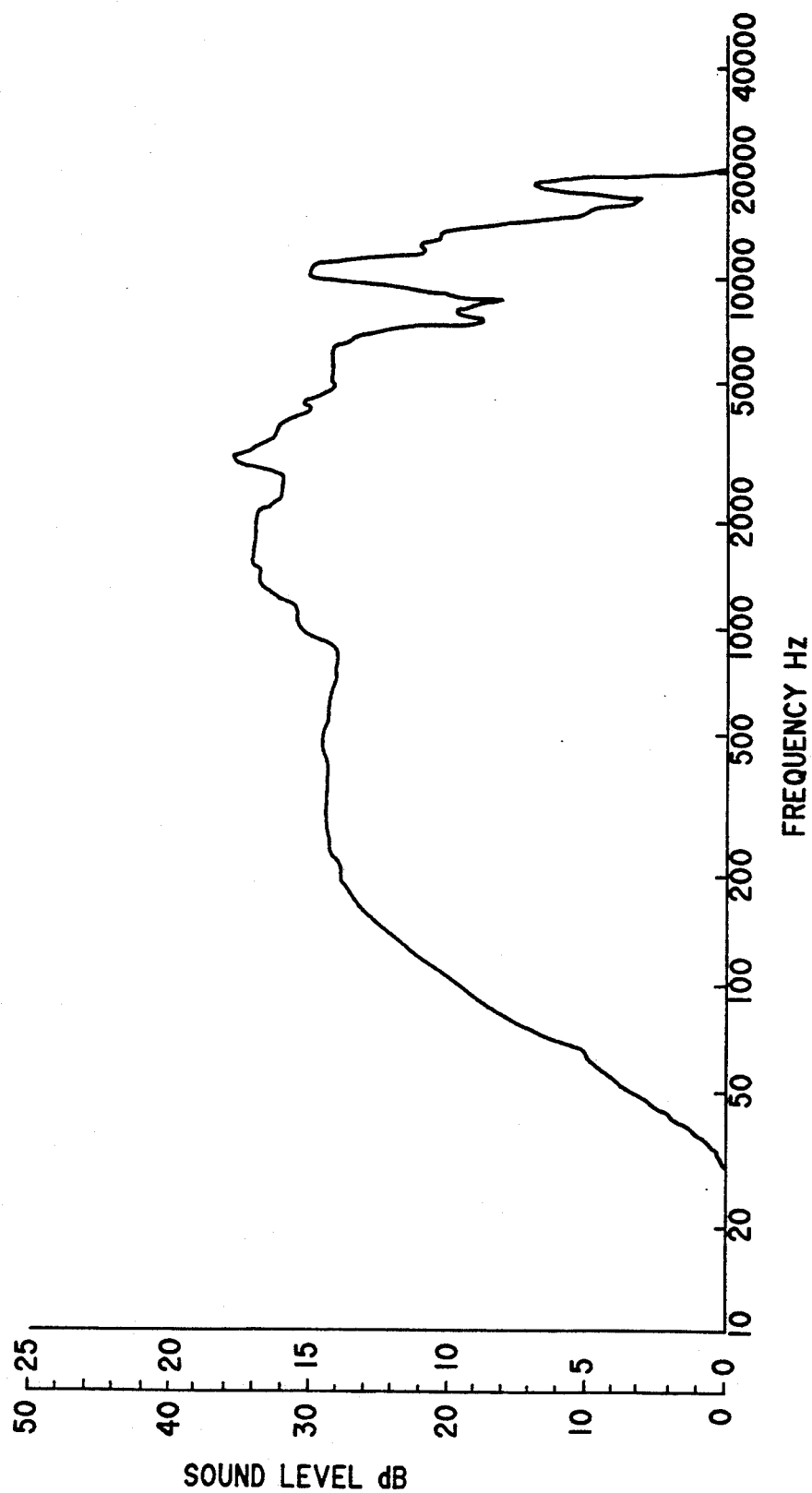
FIG. 3 is a graph showing acoustic characteristic in the case where a perforated screen for comparison purposes is placed in front of speakers.
Figure 4:
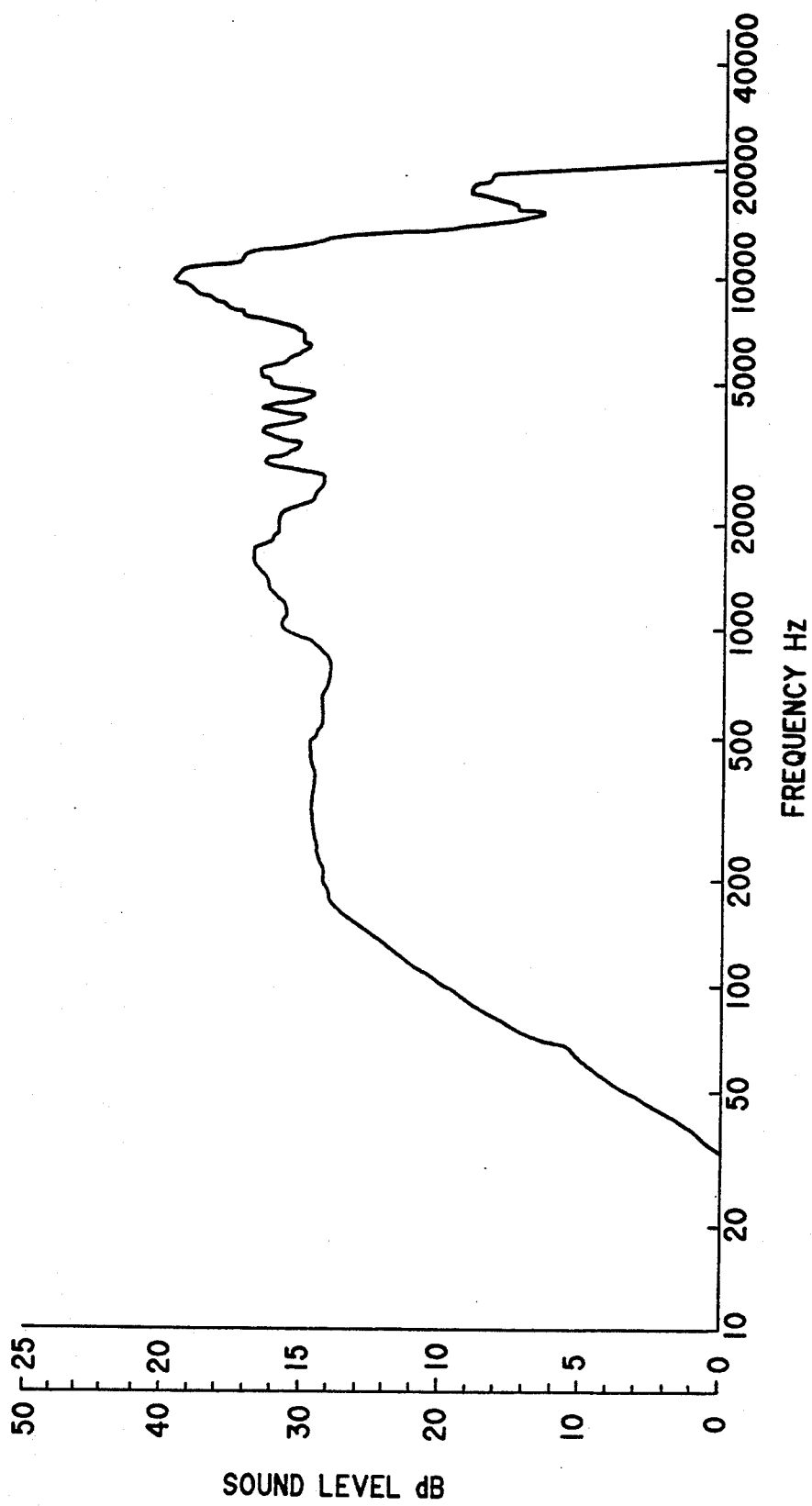
FIG. 4 is a graph showing the acoustic characteristic of a speaker.
Figure 5:
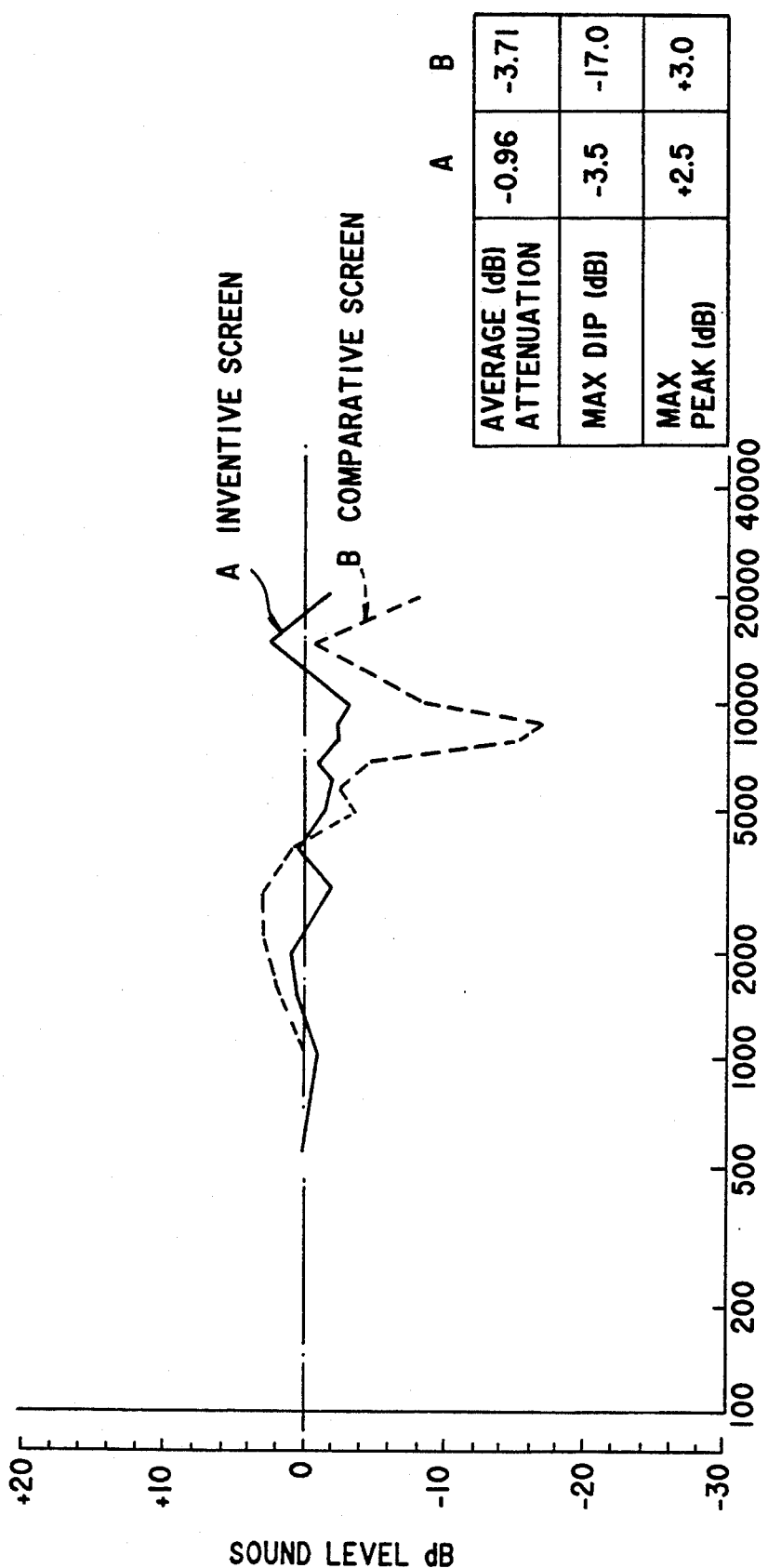
FIG. 5 is a graph showing how much the sound levels in FIGS. 2 and 3 attenuate in comparison with the sound level in FIG. 4.

FIGS. 2 and 3 show acoustic characteristics of said screen and a comparison-purpose perforated screen placed in front of speakers, wherein the pressure level (dB) is plotted on the vertical axis and the frequency (Hz) is plotted on the horizontal axis. FIG. 4 shows the acoustic characteristic of a speaker itself. FIG. 5 shows how much the sound levels of the screen of the present invention and the perforated screen attenuate in comparison with the sound level of the speaker of FIG. 4. In addition, the perforated screen compared this time is made of vinyl chloride and has a thickness of 0.46 mm, a perforation diameter of 1 mm, a perforation pitch of 5 mm, a permeability of 46.5 cc/cm$^2$/sec, said screen being one manufactured by Stuart Co., Ltd., in USA.

As is clear from FIG. 5, it has been ascertained that the screen of the present invention has an average attenuation of −0.96 dB, indicating that the attenuation is less than the −3.71 dB of the perforated screen.

Further, the following table shows the contrast by measuring the brightness (cd/m$^2$) of a screen (A) spattered on its back surface and a screen (B) not spattered, it being seen that the former (A) is improved in contrast from 0.189 to 0.157, as compared with the latter (B).

|   | Lighted portion | Shaded portion | Contrast ratio |
|---|---|---|---|
| A | 373.0 cd/m$^2$ | 58.6 cd/m$^2$ | 0.157 |
| B | 480.0 cd/m$^2$ | 90.6 cd/m$^2$ | 0.189 |

If the screen 1 is used as a projection screen for a projection TV set home theater, sharp pictorial images projected on a bright screen can be obtained. Particularly, by placing speakers on the back surface of the screen 1, sound is directly propagated to the front surface through the screen 1; thus, pictorial images true to life can be enjoyed in homes with theater presence.

What is claimed is:

1. A projection screen characterized in that it has a screen gain of not less than 0.80 and a permeability of not less than 100 cc/cm$^2$/sec and has the acoustic characteristic that the average of increase or decrease in the sound level in the audible frequency band is within ±1.0 dB and the maximum attenuation value is within −4.0 dB, the entire screen being of uniformly knitted or woven structure.

2. A projection screen as set forth in claim 1, characterized in that the space forming percentage is 20-40%.

3. A projection screen as set forth in claim 1 or 2, characterized in that the surface of the screen opposite to the projection surface is colored or is bonded with metal in such a manner as not to block the meshes of the structure.

* * * * *